United States Patent
Hirayama

(10) Patent No.: US 6,873,999 B2
(45) Date of Patent: Mar. 29, 2005

(54) MAINTENANCE INFORMATION MANAGEMENT SERVER MAINTENANCE INFORMATION MANAGEMENT SYSTEM USING THE SAME, AS WELL AS METHOD OF MANAGING MAINTENANCE INFORMATION

(75) Inventor: Kouichi Hirayama, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 425 days.

(21) Appl. No.: 10/226,201

(22) Filed: Aug. 23, 2002

(65) Prior Publication Data

US 2003/0065679 A1 Apr. 3, 2003

(30) Foreign Application Priority Data

Sep. 28, 2001 (JP) ........................................ 2001-302498

(51) Int. Cl.[7] .............................................. G06F 17/30
(52) U.S. Cl. ...................... 707/104.1; 700/110; 702/35; 714/37
(58) Field of Search ...................... 707/104.1; 700/110; 702/35; 714/37

(56) References Cited

U.S. PATENT DOCUMENTS

| 6,223,306 B1 * | 4/2001 | Silva et al. ..................... 714/37 |
| 6,259,960 B1 * | 7/2001 | Inokuchi ..................... 700/110 |
| 6,701,259 B2 * | 3/2004 | Dor et al. ..................... 702/35 |

FOREIGN PATENT DOCUMENTS

| JP | 8-147356 | 6/1996 |
| JP | 11-120100 | 4/1999 |
| JP | 11-203352 | 7/1999 |
| JP | 11-252160 | 9/1999 |

* cited by examiner

*Primary Examiner*—Charles Rones
(74) *Attorney, Agent, or Firm*—McDermott Will & Emery LLP

(57) ABSTRACT

A maintenance information management server stores: apparatus information related to apparatus name and apparatus model of semiconductor manufacturing apparatuses for each apparatus code; facility information about semiconductor manufacturing apparatuses installed in each factory/manufacturing line associated with the apparatus code; defect countermeasure information showing a content of a defect associated with the apparatus code; and defect countermeasure information. When defect information related to a semiconductor manufacturing apparatus installed in a factory/manufacturing line and countermeasure information to cope with the defect, as defect countermeasure information, are given, the maintenance information management server registers the defect countermeasure information based on the apparatus code and distributes the defect countermeasure information as maintenance information to all other factories/manufacturing lines having installed therein semiconductor manufacturing apparatuses with an apparatus code identical with that of the semiconductor manufacturing apparatus having the defect.

9 Claims, 9 Drawing Sheets

FIG.2A

MANUFACTURING APPARATUS DATA BASE

- APPARATUS S1: APPARATUS CODE / APPARATUS NAME / MODEL NAME / MANUFACTURER / MANUFACTURER INFORMATION
- APPARATUS S2: APPARATUS CODE / APPARATUS NAME / MODEL NAME / MANUFACTURER / MANUFACTURER INFORMATION
- ⋮
- APPARATUS Si: APPARATUS CODE / APPARATUS NAME / MODEL NAME / MANUFACTURER / MANUFACTURER INFORMATION

FIG.2B

FACILITY INSTALLATION DATA BASE

- MANUFACTURING LINE #1:
  - FACTORY NAME/LINE NAME
  - MAINTENANCE DEPARTMENT
  - INSTALLED APPARATUS:
    - APPARATUS CODE S1, APPARATUS UNIT #11
    - APPARATUS CODE S1, APPARATUS UNIT #12
    - APPARATUS CODE Si, APPARATUS UNIT #1m
- MANUFACTURING LINE #2:
  - FACTORY NAME/LINE NAME
  - MAINTENANCE DEPARTMENT
  - INSTALLED APPARATUS:
    - APPARATUS CODE S1, APPARATUS UNIT #11
    - APPARATUS CODE S1, APPARATUS UNIT #12
    - APPARATUS CODE Si, APPARATUS UNIT #1m
- ⋮
- MANUFACTURING LINE #n:
  - FACTORY NAME/LINE NAME
  - MAINTENANCE DEPARTMENT
  - INSTALLED APPARATUS:
    - APPARATUS CODE S1, APPARATUS UNIT #11
    - APPARATUS CODE S1, APPARATUS UNIT #12
    - APPARATUS CODE Si, APPARATUS UNIT #1m

FIG.3A
DEFECT COUNTERMEASURE DATA BASE

APPARATUS CODE s1

DEFECT #21:
- DEFECT No. f1 | OCCURRENCE DATE
- DAMAGE AMOUNT
- HANDLING URGENCY DEGREE p1
- DEFECT CONTENT
- COUNTERMEASURE PRIORITY ORDER:
  - COUNTERMEASURE No. t1 | DISTRIBUTED — COUNTERMEASURE CONTENT | TIME LIMIT
  - COUNTERMEASURE No. t2 | DISTRIBUTED — COUNTERMEASURE CONTENT | TIME LIMIT
  - COUNTERMEASURE No. ti | NOT DISTRIBUTED — COUNTERMEASURE CONTENT | TIME LIMIT

APPARATUS CODE s2

DEFECT #22:
- DEFECT No. f1 | OCCURRENCE DATE
- DAMAGE AMOUNT
- HANDLING URGENCY DEGREE p3
- DEFECT CONTENT
- COUNTERMEASURE PRIORITY ORDER:
  - COUNTERMEASURE No. t1 | DISTRIBUTED — COUNTERMEASURE CONTENT | TIME LIMIT
  - COUNTERMEASURE No. t2 | NOT DISTRIBUTED — COUNTERMEASURE CONTENT | TIME LIMIT
  - COUNTERMEASURE No. ti | NOT DISTRIBUTED — COUNTERMEASURE CONTENT | TIME LIMIT

⋮

APPARATUS CODE si

DEFECT #2i:
- DEFECT No. f1 | OCCURRENCE DATE
- DAMAGE AMOUNT
- HANDLING URGENCY DEGREE p2
- DEFECT CONTENT
- COUNTERMEASURE PRIORITY ORDER:
  - COUNTERMEASURE No. t1 | DISTRIBUTED — COUNTERMEASURE CONTENT | TIME LIMIT
  - COUNTERMEASURE No. t2 | DISTRIBUTED — COUNTERMEASURE CONTENT | TIME LIMIT
  - COUNTERMEASURE No. ti | DISTRIBUTED — COUNTERMEASURE CONTENT | TIME LIMIT

FIG.3B
DEFECT COUNTERMEASURE PROGRESS DATA BASE

APPARATUS CODE s1

DEFECT No. f1 (PROGRESS IN EACH COUNTERMEASURE FOR DEFECT #21):

COUNTERMEASURE No. t1 / COUNTERMEASURE TIME LIMIT:
- FACTORY NAME/LINE No. APPARATUS UNIT #11 — PROGRESS | COUNTERMEASURE DATE
- FACTORY NAME/LINE No. APPARATUS UNIT #12 — PROGRESS | COUNTERMEASURE DATE
- FACTORY NAME/LINE No. APPARATUS UNIT #13 — PROGRESS | COUNTERMEASURE DATE
- FACTORY NAME/LINE No. APPARATUS UNIT #14 — PROGRESS | COUNTERMEASURE DATE

COUNTERMEASURE No. t2 / COUNTERMEASURE TIME LIMIT:
- FACTORY NAME/LINE No. APPARATUS UNIT #11 — PROGRESS | COUNTERMEASURE DATE
- FACTORY NAME/LINE No. APPARATUS UNIT #12 — PROGRESS | COUNTERMEASURE DATE
- FACTORY NAME/LINE No. APPARATUS UNIT #13 — PROGRESS | COUNTERMEASURE DATE
- FACTORY NAME/LINE No. APPARATUS UNIT #14 — PROGRESS | COUNTERMEASURE DATE

APPARATUS CODE s2

DEFECT No. f2 (PROGRESS IN EACH COUNTERMEASURE FOR DEFECT #22):

COUNTERMEASURE No. t1 / COUNTERMEASURE TIME LIMIT:
- FACTORY NAME/LINE No. APPARATUS UNIT #15 — PROGRESS | COUNTERMEASURE DATE
- FACTORY NAME/LINE No. APPARATUS UNIT #16 — PROGRESS | COUNTERMEASURE DATE
- FACTORY NAME/LINE No. APPARATUS UNIT #17 — PROGRESS | COUNTERMEASURE DATE
- FACTORY NAME/LINE No. APPARATUS UNIT #18 — PROGRESS | COUNTERMEASURE DATE

⋮

FIG.4A
HANDLING URGENCY DEGREE JUDGEMENT DATA BASE

| DAMAGE AMOUNT | URGENCY DEGREE |
|---|---|
| ¥a~¥b | p1 |
| ¥b~¥c | p2 |
| ¥c~¥d | p3 |
|  |  |
|  |  |
|  |  |

FIG.4B
FACILITY IMPROVEMENT DATA BASE

IMPROVEMENT #31:
- APPARATUS CODE s1
- IMPROVEMENT No. k1
- IMPROVEMENT EFFECT AMOUNT
- IMPROVEMENT CONTENT

IMPROVEMENT #32:
- APPARATUS CODE s1
- IMPROVEMENT No. k2
- IMPROVEMENT EFFECT AMOUNT
- IMPROVEMENT CONTENT

IMPROVEMENT #33:
- APPARATUS CODE s2
- IMPROVEMENT No. k3
- IMPROVEMENT EFFECT AMOUNT
- IMPROVEMENT CONTENT

⋮

IMPROVEMENT #3i:
- APPARATUS CODE si
- IMPROVEMENT No. ki
- IMPROVEMENT EFFECT AMOUNT
- IMPROVEMENT CONTENT

FIG.4C
FACILITY IMPROVEMENT PROGRESS DATA BASE

PROGRESS IN IMPROVEMENT #31:
- APPARATUS CODE s1
- IMPROVEMENT No. k1
- PROGRESS IN EACH APPARATUS UNIT:
  - FACTORY NAME/LINE No. APPARATUS UNIT #11 — PROGRESS | COUNTERMEASURE DATE
  - FACTORY NAME/LINE No. APPARATUS UNIT #12 — PROGRESS | COUNTERMEASURE DATE
  - FACTORY NAME/LINE No. APPARATUS UNIT #13 — PROGRESS | COUNTERMEASURE DATE
  - FACTORY NAME/LINE No. APPARATUS UNIT #14 — PROGRESS | COUNTERMEASURE DATE

PROGRESS IN IMPROVEMENT #32:
- APPARATUS CODE s1
- IMPROVEMENT No. k2
- PROGRESS IN EACH APPARATUS UNIT:
  - FACTORY NAME/LINE No. APPARATUS UNIT #11 — PROGRESS | COUNTERMEASURE DATE
  - FACTORY NAME/LINE No. APPARATUS UNIT #12 — PROGRESS | COUNTERMEASURE DATE
  - FACTORY NAME/LINE No. APPARATUS UNIT #13 — PROGRESS | COUNTERMEASURE DATE
  - FACTORY NAME/LINE No. APPARATUS UNIT #14 — PROGRESS | COUNTERMEASURE DATE

PROGRESS IN IMPROVEMENT #33:
- APPARATUS CODE s2
- IMPROVEMENT No. k3
- PROGRESS IN EACH APPARATUS UNIT:
  - FACTORY NAME/LINE No. APPARATUS UNIT #15 — PROGRESS | COUNTERMEASURE DATE
  - FACTORY NAME/LINE No. APPARATUS UNIT #16 — PROGRESS | COUNTERMEASURE DATE
  - FACTORY NAME/LINE No. APPARATUS UNIT #17 — PROGRESS | COUNTERMEASURE DATE
  - FACTORY NAME/LINE No. APPARATUS UNIT #18 — PROGRESS | COUNTERMEASURE DATE

⋮

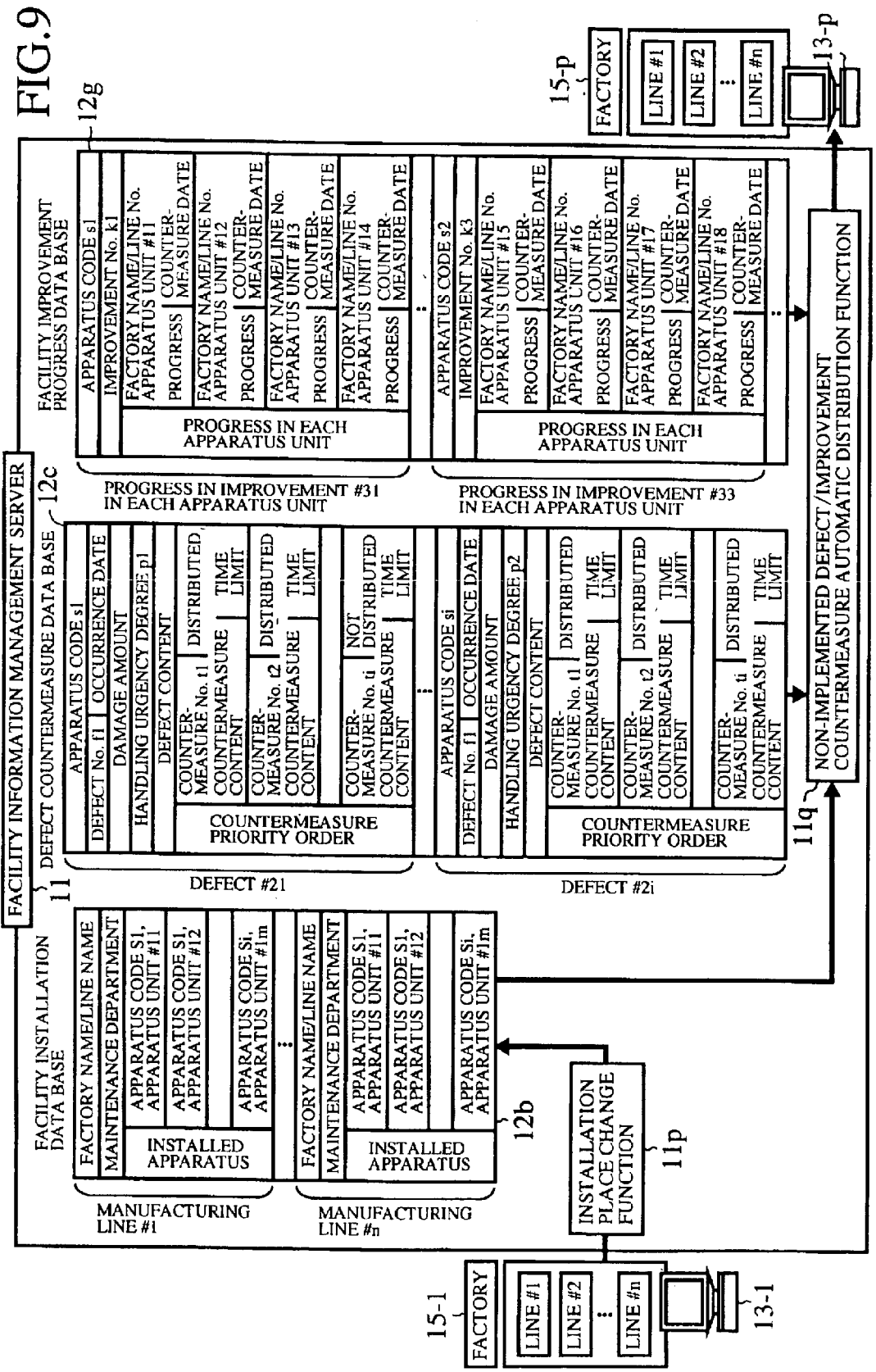

MAINTENANCE INFORMATION MANAGEMENT SERVER MAINTENANCE INFORMATION MANAGEMENT SYSTEM USING THE SAME, AS WELL AS METHOD OF MANAGING MAINTENANCE INFORMATION

BACKGROUND OF THE INVENTION

1. Field of the Invention

This invention relates to a maintenance information management server, as well as to a maintenance information management system which uses this maintenance information management server, and relates, in particular, to a maintenance information management server which is used in managing various pieces of maintenance information related to semi conductor manufacturing apparatuses which are used in manufacturing semiconductor devices, as well as to a maintenance information management system and method of managing the maintenance information, both by using this maintenance information management server.

2. Description of Related Art

When data are transmitted from a transmission terminal device to a reception terminal device, a mail server is generally used. As a method for the mail server to automatically distribute data to the reception terminal device, there is known a method as described in, for example, Japanese Patent Application Laid-open No. 252160/1999 (hereinafter called as a conventional example 1).

In the conventional example 1, when data have arrived, the mail server writes in the notifying information a predetermined identification code for notifying the arrival of the data, thereby informing the reception terminal device of the arrival of the data. The reception terminal device then analyses the identifying code in the notifying information and, if the identifying code is judged to be the one as previously defined, the communication is opened. The mail server uses this opened communication to thereby distribute the data to the reception terminal device. Then, in the conventional example 1, the distributing conditions at the time of distributing the data to the reception terminal device are stored in advance in the database. When the data are to be distributed to the reception terminal device, the distributing condition database is searched.

In this manner, in the conventional example 1, if the identifying code is found to be the one previously defined by using the notifying information, the communication is opened and the data are automatically distributed to the reception terminal device. In distributing the data, a searching must be made to the distribution condition database.

Further, as a method of automatically transmitting a result of processing made by a computer (processed result) through an electronic mail, there is known a method as described in Japanese Patent Application Laid-open No. 120100/1999 (hereinafter called a conventional example 2).

In the conventional example 2, the processed result for each of the jobs processed by a computer is once stored in a volume. Then, a processed result transmission management system refers to a transmission destination management list in which the transmission destination's identification (ID) code has been registered in association with a job name, and downloads into the mail server the applicable or relevant job name, the processed result, and the transmission destination's mail ID. The mail server thus distributes to the transmission destination's mail ID the processed result of the job as an attached file.

In addition, as a method of registering a facility management ledger in accordance with which the facility management work is performed and of automatically distributing various pieces of information concerning the facility in response to the facility management ledger, there is known a method in, for example, Japanese Patent Application Laid-open No. 203352/1999 (hereinafter called a conventional example 3).

In this conventional example 3, a computer for managing the equipment/facility is provided with a database having registered therein various pieces of information related to the facility management. Further, the computer refers to the facility ledger for the purpose of grasping the status of the facility, and also performs the management of preparation of slips, drawings, etc. Still further, the computer prepares plans for facility management work or the like and assists the work related to the inspection of the facility. In addition, the computer obtains information about the operation/failure of the facility and obtains and processes information about the facility which has caused an abnormality at the time of emergency. Then, the computer distributes to other persons in charge the work schedule and the details of the work processed as described above, and also distributes to the other persons concerning urgent information such as the operating conditions/troubles, etc. of the facility and equipments.

The semiconductor manufacturing system used for the manufacturing semiconductors are large in number of the manufacturing processes and the kinds/number of the manufacturing apparatuses to be used. Therefore, as far as the entire manufacturing lines in the semiconductor manufacturing factory are concerned, it becomes necessary to grasp extremely large number of, and various kinds of, information in order to perform the maintenance management of the manufacturing processes and the manufacturing apparatuses. In addition, the semiconductors are often manufactured not only in one factory but also in a plurality of manufacturing places (factories), with the result that the same kind of manufacturing apparatuses are often used in a plurality of factories. A plurality of the same kind of manufacturing apparatuses are sometimes installed in the same factory.

Once a trouble occurs to one manufacturing apparatus in a manufacturing line, the trouble affects the entire manufacturing lines, resulting not only in a vast amount of damages but also in the necessity of taking a plurality of countermeasures (urgent handling, permanent countermeasure, prevention of repeated occurrence, or the like) against a single trouble. As a consequence, the entire manufacturing line will have extremely large number of countermeasure items for which countermeasuring actions must be taken, and it becomes difficult to grasp the order of priority among those items. In addition, in accordance with a change in the kind of product to be manufactured, the manufacturing apparatus is sometimes transferred or relocated from one factory to another. Then, in such another factory it sometimes becomes difficult to accurately grasp information about the manufacturing apparatus to be relocated.

In view of the above-described problems, there is carried out a practice of recording the maintenance information related to the semiconductor manufacturing apparatuses into a database. It is, however, only to record the maintenance information, and it is therefore difficult to effectively utilize the maintenance information. It is thus extremely difficult to manage the maintenance information of the entire factories and effectively utilize it.

Although a description was made in the above-described conventional example 1 as to distributing data based on the distributing conditions, it is difficult to manage in a unified way and effectively utilize the maintenance information concerning the semiconductor manufacturing apparatuses for all of the factories. There was therefore a problem in that the maintenance information cannot be adequately managed.

The above-described conventional example 2 does nothing but automatically transmitting the attached file to the destination based on the destination's ID. Similarly, it is difficult to manage in a unified way and effectively utilize the maintenance information concerning the semiconductor manufacturing apparatuses for all of the factories. There was therefore a problem in that the maintenance information cannot be adequately managed.

In the above-described conventional example 3, on the other hand, it is true that the information concerning the facility is recorded into the database and is distributed to other persons in charge, but it is nothing but recording and distributing the information related to the facility. Therefore, there was such a problem that an adequate management cannot be made in managing and utilizing the maintenance information attributable to the above-described semiconductor manufacturing apparatuses.

Since the conventional information management systems are arranged as described above, while data can be automatically distributed based on predetermined distributing conditions (destination's ID) or the like, there was such a problem that an extreme difficulty exists in adequately managing and effectively utilizing the maintenance information concerning the semiconductor manufacturing apparatuses for all of the semiconductor manufacturing factories.

This invention has been made to solve the above-described and other problems and has an object of providing a maintenance information management server which can adequately manage and utilize the maintenance information concerning the semiconductor manufacturing apparatuses for all the semiconductor manufacturing factories, as well as a maintenance information management system and a method of managing the maintenance information by using the maintenance information management server.

SUMMARY OF THE INVENTION

In order to attain the above and other objects, the present invention provides a maintenance information management server which is adapted to be connected to: a manufacturing apparatus database having stored therein an apparatus code for identifying a semiconductor manufacturing apparatus for each kind of semiconductor manufacturing apparatuses, and having stored therein apparatus information related to an apparatus name and an apparatus model name of a semiconductor manufacturing apparatus for each of the apparatus codes; a facility installation database having registered therein facility information about a semiconductor manufacturing apparatus installed in each factory/manufacturing line in association with the apparatus code; and also to a defect countermeasure database having stored therein defect information showing the content of a defect occurred to an applicable semiconductor manufacturing apparatus in association at least with the apparatus code and having stored therein defect countermeasure information showing the content of a countermeasure in association with the defect information. The maintenance information management server includes: a defect countermeasure information registration function which, when defect information related to an applicable semiconductor manufacturing apparatus installed in an applicable factory/manufacturing line and countermeasure information to cope with the defect, as defect countermeasure information, are given from one of the factories/manufacturing lines, searches the facility installation database to thereby obtain an apparatus code of the applicable semiconductor manufacturing apparatus having the defect and also to register the defect countermeasure information into the defect countermeasure database based on the apparatus code; and a defect countermeasure information distribution function which searches the facility installation database based on the apparatus code of the semiconductor manufacturing apparatus having the defect and distributes the defect countermeasure information as maintenance information to all other factories/ manufacturing lines having installed therein semiconductor manufacturing apparatuses each with an apparatus code identical with the apparatus code of the applicable semiconductor manufacturing apparatus having the defect. Therefore, there is such an effect that the maintenance information (defect information and countermeasure information) can be adequately managed and utilized in all the factories/manufacturing lines.

Further, since the maintenance information management server preferably includes further an additional countermeasure registration function and an additional countermeasure information distribution function which searches the facility installation database, the facility information management server registers additional countermeasure information into the defect countermeasure database and distributes this additional countermeasure information to all other factories/ manufacturing lines provided with semiconductor manufacturing apparatuses, each having an apparatus code identical with that of the apparatus having the defect. Therefore, there is such an effect that all the maintenance information can be effectively utilized in all the factories/manufacturing lines.

Still further, the maintenance information management server is adapted to be connected to a handling urgency degree table having registered therein a degree of urgency for handling the defect in accordance with a damage amount, and is sent to the other factories/manufacturing lines, so that it is possible on the part of the factories/manufacturing lines to implement countermeasures in response to the handling urgency degree.

The present invention further provides a maintenance information management system in which a maintenance information management server as constructed above and a terminal apparatus disposed in each of the factories/ manufacturing lines are connected by a network, so that the above-mentioned effects can be reinforced.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 2A and 2B are tables showing an arrangement of a group of data bases to be used in the maintenance information management system shown in FIG. 1, wherein FIG. 2A is a manufacturing apparatus database, and FIG. 2B is a facility installation database;

FIGS. 3A and 3B are tables showing a group of databases to be used in the maintenance information management system shown in FIG. 1, wherein FIG. 3A shows a defect countermeasure databases, and FIG. 3B shows a defect countermeasure progress database;

FIGS. 4A through 4C are tables showing a group of databases to be used in the maintenance information management system shown in FIG. 1, wherein FIG. 4A shows a handling urgency degree judgment database (table), FIG. 4B shows a facility improvement database, and FIG. 4C shows a facility improvement progress database;

FIG. 9 is a schematic diagram showing a maintenance information management system according to a fourth embodiment of this invention.

DETAILED DESCRIPTION OF PREFERRED EMBODIMENTS

A description will now be made as to the embodiments of this invention.

First Embodiment

Figure 1:
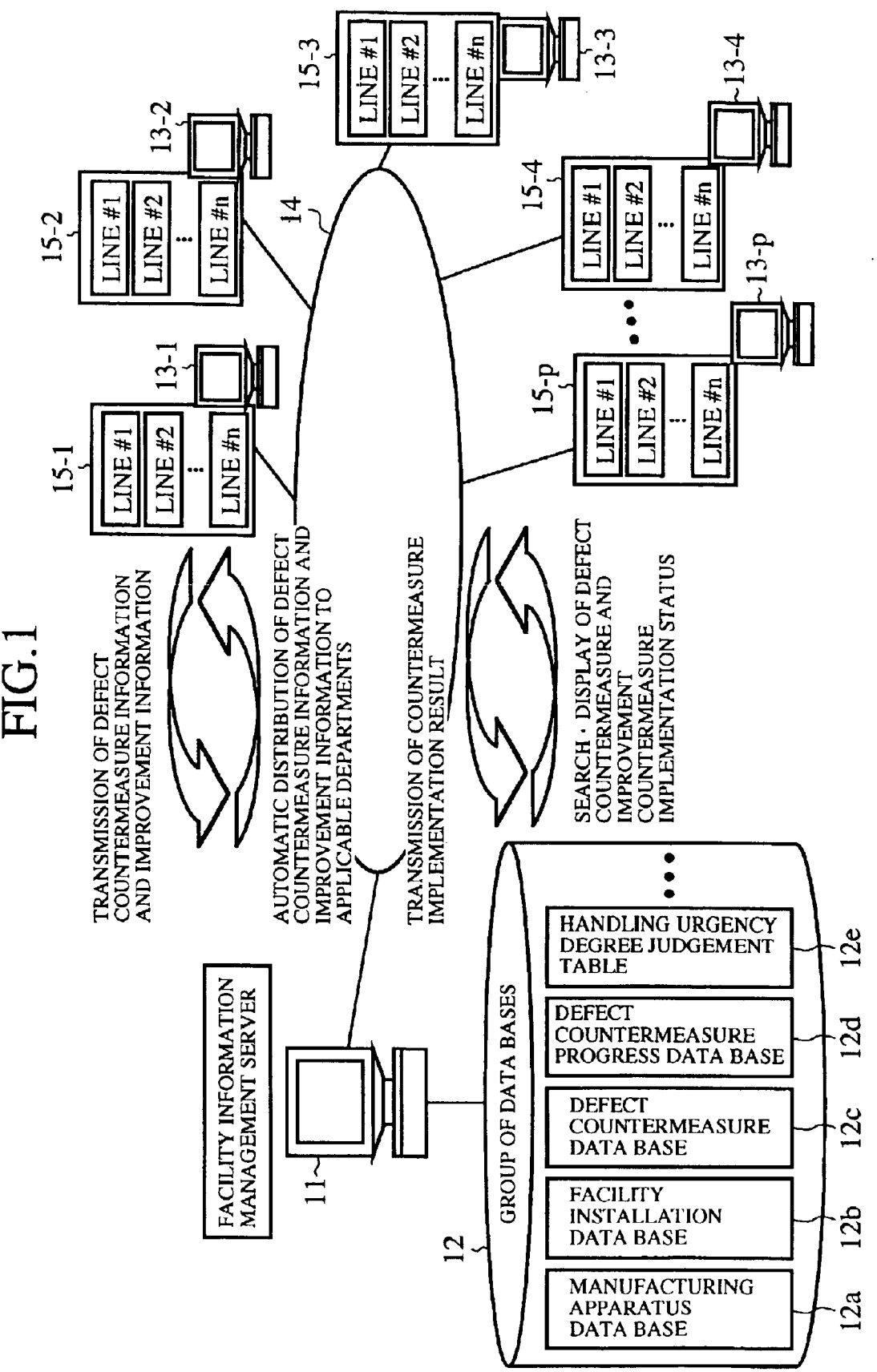
FIG. 1 is a diagram showing an example of arrangement of a maintenance information management system according to this invention.

In FIG. 1, reference numeral 11 denotes a server for centrally managing or controlling the maintenance information about semiconductor manufacturing apparatuses (this server is hereinafter simply called a facility information management server or a maintenance information management server). Reference numeral 12 denotes a group of databases and reference numerals 13-1 through 13-p (p is an integer larger than 2) denote client's apparatuses (hereinafter simply called terminal apparatuses). The facility information management server 11 and the terminal apparatuses 13-1 through 13-p are connected to one another through a network (e.g., an intranet) 14. In the illustrated example, the terminal apparatuses 13-1 through 13-p are disposed in respective semiconductor manufacturing factories (hereinafter simply called factories) 15-1 through 15-p, respectively. In the illustrated example, to simplify the description, only one terminal apparatus is shown to be disposed in each factory, but the terminal apparatus is actually disposed in each of manufacturing lines (in each of maintenance departments) of the respective factories. The facility information management server 11 is disposed in a central control department of a head office or the like. In each of the factories 15-1 through 15-p, semiconductor manufacturing lines (hereinafter simply called manufacturing lines) #1 through #n (n is an integer larger than 2) are in operation. It is presumed that at least one semiconductor manufacturing apparatus is disposed or installed in each of the manufacturing lines #1 through #n. The above-described group of data bases 12 are provided at least with a manufacturing apparatus database (i.e., a database related to manufacturing apparatuses) 12a, a facility installation database (i.e., a database related to the installation of facilities) 12b, a defect countermeasure database (i.e., a database related to countermeasures to be taken against defects) 12c, a defect countermeasure progress database (i.e., a database related to the progress of countermeasures to be taken against defects) 12d, a handling urgency degree judgment table (i.e., a table showing the degree of urgency for handling defects) 12e, a facility improvement database (i.e., a database related to improvements to be made in facilities) 12f and a facility improvement progress database (i.e., a database related to the progress of improvements to be made in facilities) 12g. In FIG. 1, the facility improvement database 12f and the facility improvement progress database 12g are not illustrated. These databases and the tables have stored therein such data as those described in more detail hereinafter.

The facility information management server 11 automatically distributes defect information and improvement information related to the semiconductor manufacturing apparatuses to the terminal apparatuses 13-1 through 13-p by a mail system as described in more detail hereinafter, and also receives transmission of defect countermeasure information and improvement information related to the applicable factories/manufacturing lines from each of the terminal apparatuses 13-1 through 13-p. Further, in reply to searching at each of the terminal apparatuses 13-1 through 13-p, the facility information management server 11 transmits the search results (e.g., the status of implementation or carrying out of the countermeasure to be taken against a defect and that of an improvement countermeasure) to the terminal apparatuses by a Web system. The facility information management server 11 then collects, e.g., the countermeasure implementation result from each of the terminal apparatuses 13-1 through 13-p.

With reference to FIGS. 2A and 2B, 3A and 3B, as well as 4A, 4B and 4C, a description will now be made about the constitution or arrangement of the databases.

FIG. 2A shows an arrangement of the manufacturing apparatus database 12a, which stores therein for each kind of the semiconductor manufacturing apparatuses, a peculiar or specific apparatus code, an apparatus name, an apparatus model name, a manufacturer's name, manufacturer information related to the manufacturer, or the like. In the illustrated example, the peculiar pieces of information about the apparatus code, the apparatus name, the manufacture's name and the manufacturer's information related to the respective semiconductor manufacturing apparatuses S1 through Si (i is an integer larger than 2) are respectively stored in the manufacturing apparatus database 12a.

FIG. 2B shows an arrangement of the facility installation database 12b, which stores therein the maintenance department information (maintenance information) of each of the manufacturing lines for each of the factories 15-1 through 15-p and also stores therein information about the manufacturing apparatuses installed in each of the manufacturing lines (apparatus information). In the illustrated example, factory names/line names are registered first, followed by the maintenance department information (maintenance department) for each of the manufacturing line numbers #1 through #n. In each of the manufacturing line numbers #1 through #n, there are registered as many as apparatus unit numbers #11 through #1m are installed for each of the apparatus codes of the manufacturing apparatuses installed in the manufacturing line in question.

FIG. 3A shows an arrangement of the defect countermeasure database 12c, which stores therein for each of the defects, the code of the applicable apparatus, an estimated amount of damage (damage amount), the handling urgency degree, the contents of the defect, the priority of countermeasure (i.e., the order of priority in which the countermeasure is to be taken), the contents of the countermeasures, and the countermeasure time limit (i.e., the time limit for taking the countermeasure). In the illustrated example, there are recorded, for the respective apparatus codes s1 through si, the defect numbers (Nos. f1 through fi) and the dates of occurrence, as well as the damage amounts, the degree of urgency of handling, the contents of the defects, and the priority of countermeasures. Further, in response to the countermeasure time limit, there are recorded the numbers (Nos. t1 through ti) for the respective countermeasures, the contents of the countermeasures, and the countermeasure priority order, and there is also recorded the information (flags) to show whether these countermeasure numbers (Nos.), the contents of the countermeasures and the countermeasure time limits have been distributed or not. In other words, if they have been distributed, "already distributed" is recorded and, if they have not been distributed yet, "not distributed yet" is recorded. In this manner, as shown in FIG. 3A, the defect countermeasure database 12c will have sequentially stored therein, for example, the defects #21 through #2i (i is an integer larger than 2). It is to be noted that a plurality of defects will sometimes be registered with reference to a single apparatus code. Although apparatus codes s1 through si are used as the apparatus codes in FIG. 3A, it should be understood that there are only "I" pieces of apparatus codes in number in any case, and there is no relationship between the defects and the apparatus code i.

FIG. 3B shows an arrangement of the defect countermeasure progress database 12d, which stores therein for each of the defects and countermeasures the name of the factory in which the countermeasures shall be implemented or performed, the manufacturing line number, the apparatus unit number in question (manufacturing apparatus), the progress status of the countermeasure, and the date of the countermeasure. In other words, the defect countermeasure progress database 12d will have recorded therein the progress status of the countermeasure for each of the defects. In the illustrated example, the defect numbers (Nos.) to cover the number of installed apparatuses (#11 through #1m) are recorded in association with the apparatus codes, and the progress status for each of the countermeasures will be recorded. In the column of the progress in each countermeasure, its number (No.) and the countermeasure time limit are recorded for the respective countermeasures, and the name of factory/manufacturing line in which the countermeasure designated by the countermeasure number (or the countermeasure number in question) shall be implemented, the apparatus unit number, the status as to whether the countermeasure is in progress or not (if in progress, "in progress" is recorded), and the date in which the countermeasure is implemented are recorded. FIG. 3B shows that the countermeasure progress of defect #21 is divided or classified into countermeasure Nos. t1 and t2, and that the countermeasure progress #22 has a countermeasure No. t1.

FIG. 4A shows an arrangement of the handling urgency degree judgment database (table) 12e, which has recorded therein rank information for judging the rank of urgency degree of handling (taking a countermeasure). In the illustrated example, the damage amount and the urgency degree (p1 through p3) are recorded as the rank information.

FIG. 4B shows an arrangement of the facility improvement database 12f, which has recorded therein for each of the improvement items the applicable apparatus code, the improvement effect, the contents of the improvement. In the illustrated example, the apparatus codes, the improvement numbers (Nos. k1 through ki), amounts of improvement effects, and the contents of the improvements are recorded for each of the improvements #31 through 3i.

FIG. 4C shows an arrangement of the facility improvement progress database 12g, which has recorded therein the factory names/manufacturing lines in which the countermeasure shall be implemented, the applicable apparatus unit (apparatus), the status of progress, and the date of countermeasure for each of the improvement items. In the illustrated example, the apparatus code number and the improvement number are recorded for each of the improvement items (k1, k2, k3, . . . ), and the progress for each of the apparatus unit numbers is recorded The progress of each apparatus unit has recorded therein the factory name/manufacturing line number to be designated by the applicable apparatus code and the improvement number, the apparatus unit number, the status as to whether the countermeasure is in progress or not (if in progress, "in progress" is recorded), and the date of countermeasure.

Now, a description will be made about the operation.

Figure 5:
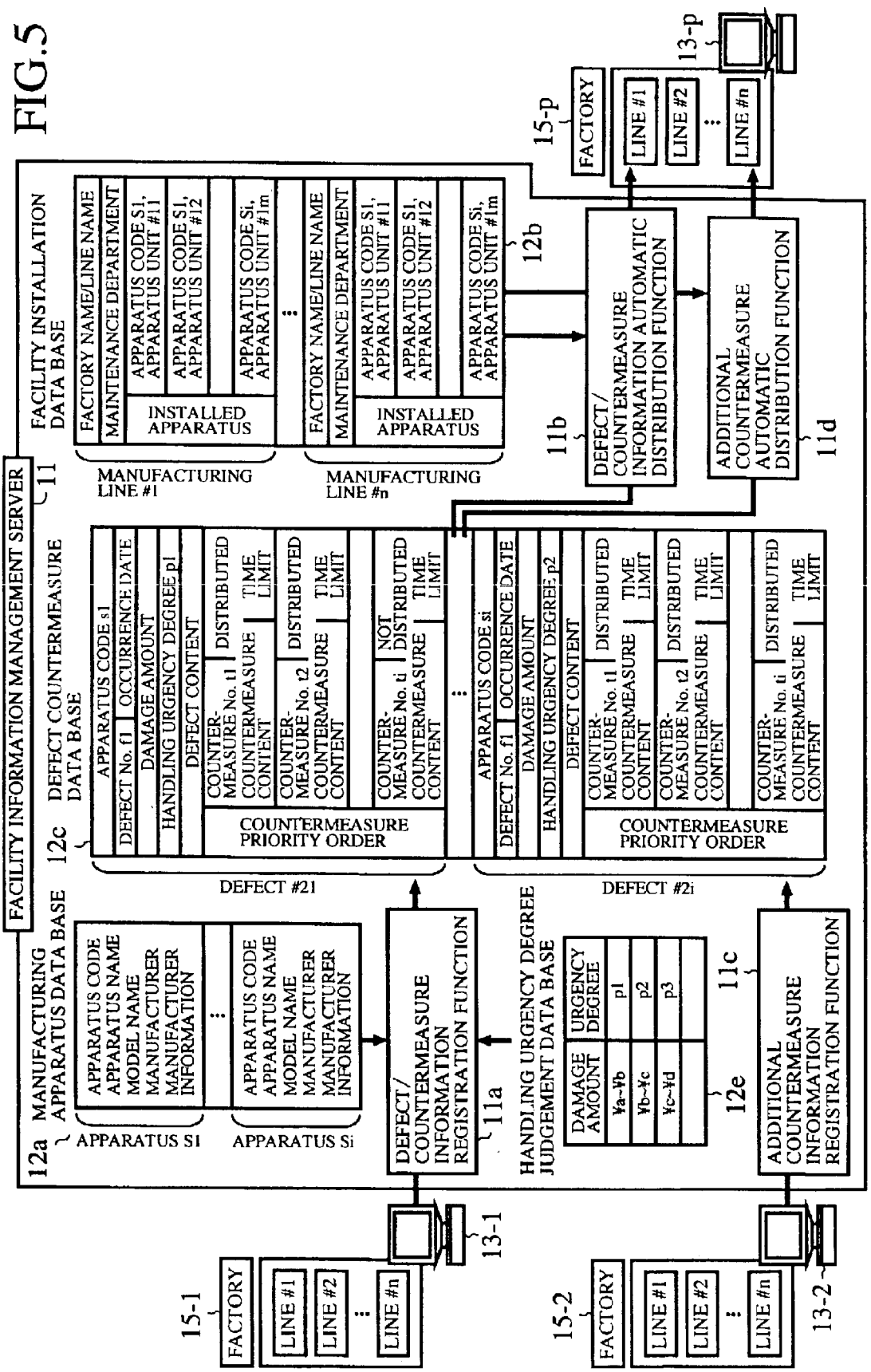
FIG. 5 is a schematic diagram showing a maintenance information management system according to a first embodiment of this invention.

With reference to FIG. 5, the facility information management server 11 has a defect/countermeasure information registration function 11a (i.e., a function to register the information about the defect and countermeasure) and a defect/countermeasure information automatic distribution function 11b (i.e., a function to automatically distribute the information about the defect and countermeasure). Let us assume that defect information related to the semiconductor manufacturing apparatus and the countermeasure information to handle this defect have been transmitted from the terminal apparatus 13-1 to the facility information management server 11 as defect/countermeasure information. This defect/countermeasure information has added thereto the information showing the semiconductor manufacturing apparatuses (hereinafter called the apparatus information; this apparatus information is the information to specify the applicable semiconductor manufacturing apparatus and is any one of the pieces of information recorded in the manufacturing apparatus database 12a), an estimated damage amount, and the date of occurrence. The facility information management server 11 searches the manufacturing apparatus database 12a based on the apparatus information to thereby obtain the apparatus code. Further, the facility information management server 11 refers to the handling urgency degree judgment table 12e based on the estimated damage amount to thereby obtain the urgency degree information (handling urgency degree) based on the estimated damage amount.

Thereafter, the facility information management server 11 records the defect/countermeasure information in the defect countermeasure database 12c as the defect countermeasure as described in FIG. 3A in accordance with the apparatus code, the date of occurrence, and the handling urgency degree. As described in FIG. 3A, the defect countermeasure database 12c has added thereto a defect number (i.e., the number of the defect) for each of the defects/countermeasures. In addition, in case there are a plurality of countermeasures for one defect, countermeasure handling time limits are added to these plurality of countermeasures based on the contents of the countermeasures or the like. Recording is made into the defect countermeasure database 12c such that the shorter the time limit, the higher the priority in handling the countermeasure.

In the manner as described above, the facility information management server 11 registers the defect/countermeasure information into the defect countermeasure database 12c by the defect/countermeasure information registration function 11a.

In this manner, in a state in which the defect/countermeasure information has been registered, the flags to show whether the distribution has been finished or not as described with reference to FIG. 3A have not been recorded yet, i.e., the state is still "not distributed yet." If there is non-distributed defect/countermeasure information, the facility information management server 11 refers to the facility installation database 12b to thereby check the name of the factory/manufacturing line in which the manufacturing apparatus related to the non-distributed defect/ countermeasure information is being used. In other words, the facility information management server 11 searches the facility installation database 12b based on the apparatus code related to the non-distributed defect/countermeasure information to thereby obtain the name of the factory/manufacturing line in which the applicable manufacturing apparatus related to the apparatus code is being used. Then, the facility information management server 11 distributes to the applicable terminal apparatuses, based on the factory name/manufacturing line name, the handling priority (handling urgency degree), the contents of the countermeasure (inclusive of the order of priority, and inclusive of the contents of the defect), and the applicable apparatus unit number as the defect/countermeasure information by using the defect/countermeasure information automatic distribution function 11b. In the illustrated example, the defect/countermeasure distribution information has been distributed to the terminal apparatus 13-p.

The facility information management server 11 thus sends, through the defect/countermeasure information automatic distribution function 11b, the defect information to the factory/manufacturing line (maintenance department) in which the applicable manufacturing apparatus is being used.

As an additional function, the facility information management server 11 has an additional countermeasure information registration function (i.e., a function to register the information about an additional countermeasure) 11c and an additional countermeasure automatic distribution function (i.e., a function to automatically distributing an additional countermeasure) 11d. If additional countermeasure information related to the defect that has already been registered is sent from the terminal apparatus 13-2, the facility information management server 11 registers the additional countermeasure information into the defect countermeasure database 12c in association with (or by correlating it to) the registered defect based on the apparatus code, in a manner as described above (additional countermeasure information registration function 11c).

Since this additional countermeasure information is in a state in which the flag of completion of distribution has not been added yet, the facility information management server 11 refers to the facility installation database 12b as described earlier to thereby distribute the additional countermeasure contents and the applicable apparatus number to the applicable terminal apparatuses as the additional countermeasure distribution information (additional countermeasure automatic distribution function 11d).

As described above, according to the first embodiment, when the defect information related to the semiconductor manufacturing apparatus i s sent together with the countermeasure information which shows the countermeasure to be taken, it is stored in the database in response to the apparatus code and the degree of urgency of handling. Further, the defect/countermeasure information is automatically sent to all the factories/manufacturing lines (maintenance departments) in which the semiconductor manufacturing apparatuses related to the apparatus code are being used. Therefore, there is such an effect that the countermeasure can be taken in advance in the factories/manufacturing lines using the same semiconductor manufacturing apparatuses before the defect actually occurs. As a result, the defect/countermeasure information can be effectively utilized in all the factories/manufacturing lines.

Second Embodiment

Figure 6:
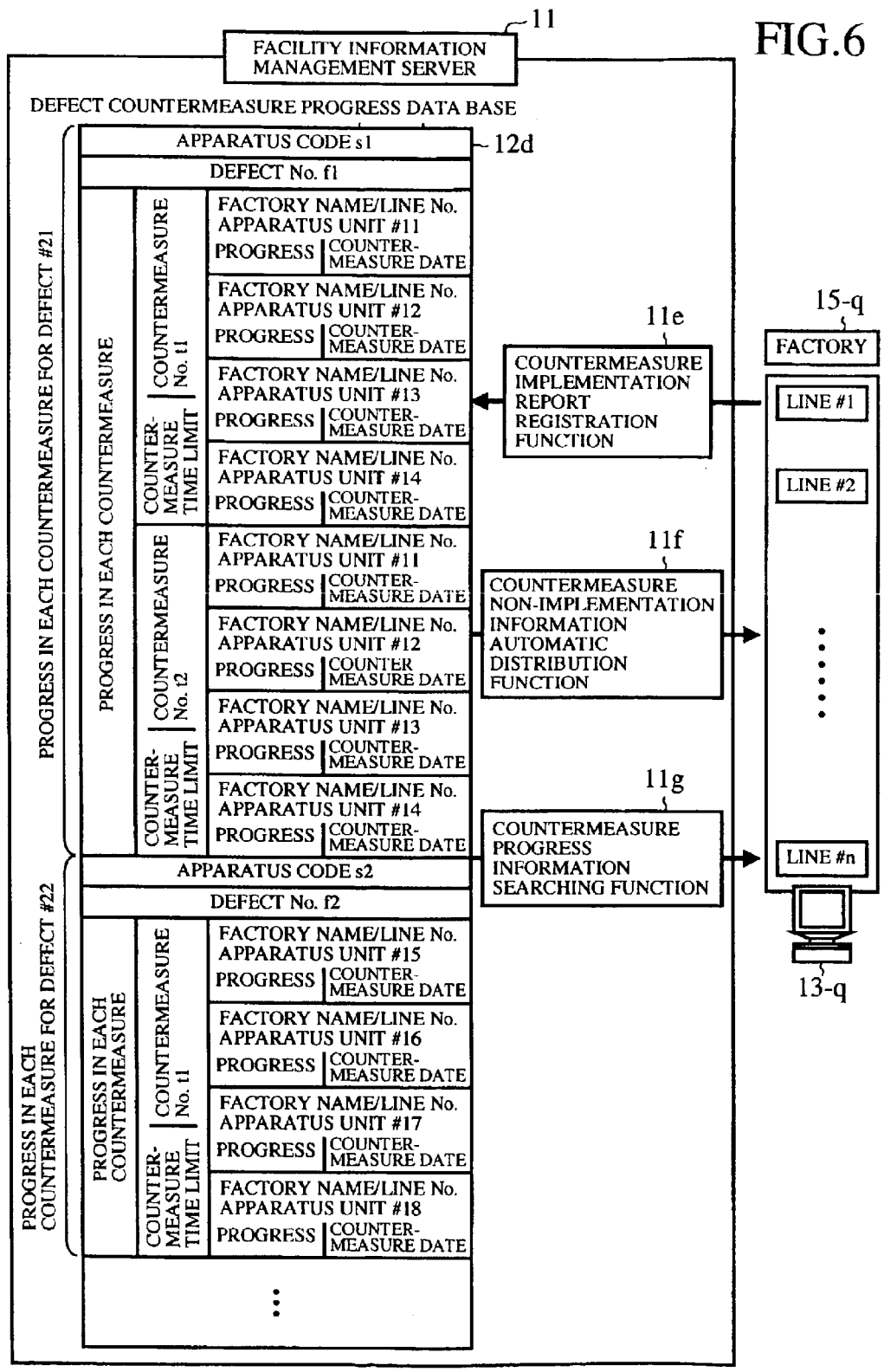
FIG. 6 is a schematic diagram showing a maintenance information management system according to a second embodiment of this invention.

With reference to FIG. 6, the facility information management server 11 monitors the defect countermeasure implementation status in all the factories and in all the manufacturing lines. In a manner as described with reference to FIG. 5, the defect/countermeasure information is automatically distributed to the factory/manufacturing lines (i.e., terminal apparatuses) in which the manufacturing apparatuses corresponding to the apparatus code are being used. In FIG. 6, the applicable factory is denoted by reference numeral 15-q (q is an integer larger than 1 up to q) and the terminal apparatus is denoted by reference numeral 15-q. In the factory 13-q, a countermeasure is taken with the applicable manufacturing apparatus based on the defect/countermeasure information. Once the countermeasure has been taken, the apparatus unit number with which the countermeasure has been taken, the defect countermeasure (countermeasure number), and the factory name/manufacturing line number are sent from the terminal apparatus 13-q to the facility information management server 11 through a mail system as a countermeasure implementation report. The facility information management server 11 recognizes the date of receiving the countermeasure implementation report as the countermeasure date. The countermeasure implementation report is then registered in the defect countermeasure progress database 12d to thereby renew the countermeasure progress database (countermeasure implementation report renewal function, i.e., a function to renew the report on implementation of the countermeasure, 11e).

On the other hand, the facility information management server 11 keeps on monitoring the defect countermeasure progress database 12d. Regarding the apparatus number and the defect number for which the countermeasure date has not been registered even after a lapse of the countermeasure time limit assigned to each of the countermeasure numbers, the apparatus unit number with which the countermeasure must be taken is designated, and the content of the countermeasure (countermeasure information) is automatically transmitted to the factory/manufacturing line (i.e., the terminal apparatus) in which the manufacturing apparatus (the applicable apparatus unit number) is being used based on the apparatus code and the defect number as described in FIG. 5, whereby implementation of the countermeasure is urged (countermeasure non-implementation information automatic distribution function, i.e., a function to automatically distribute information about non-implementation of the countermeasure, 11f).

In addition, by using the terminal apparatus 13-q, the countermeasure implemented in each of the apparatus units can be referred to. In this case, when the apparatus unit number (apparatus code) is designated from the terminal apparatus 13-q, the apparatus unit designation information is sent from the terminal apparatus 13-q to the facility information management server 11. The facility information management server 11 searches the defect countermeasure progress database 12d based on the apparatus unit information to thereby obtain the implementation countermeasure number and the non-implementation countermeasure number related to the applicable apparatus unit. Then, the facility information management server 11 refers to the defect countermeasure database 12c (not illustrated in FIG. 6) in accordance with the countermeasure number and the apparatus code to thereby obtain the contents of countermeasure for each of the apparatus units. Thereafter, the facility information management server 11 specifies the contents of countermeasure and/or non-implemented countermeasure for each of the apparatus units to thereby form a list of implemented/non-implemented countermeasures. The list of implemented/non-implemented countermeasures is transmitted to the applicable terminal apparatus 13-q as the countermeasure progress information (countermeasure progress information searching function 11g, i.e., a function to search the information about the progress in countermeasure) The countermeasure progress information is displayed in the terminal apparatus 13-q.

As described above, in the second embodiment, unless the countermeasure date is registered even after the lapse of the countermeasure due date, the facility information management server 11 makes an automatic distribution to the applicable terminal apparatus to urge that the countermeasure be taken. Therefore, it is possible to take a quick countermeasure against the defect. In case it is desired to confirm the implemented or non-implemented countermeasure on the part of the terminal apparatus, the countermeasure progress information can be obtained by making an access to the facility information management server 11.

Figure 7:
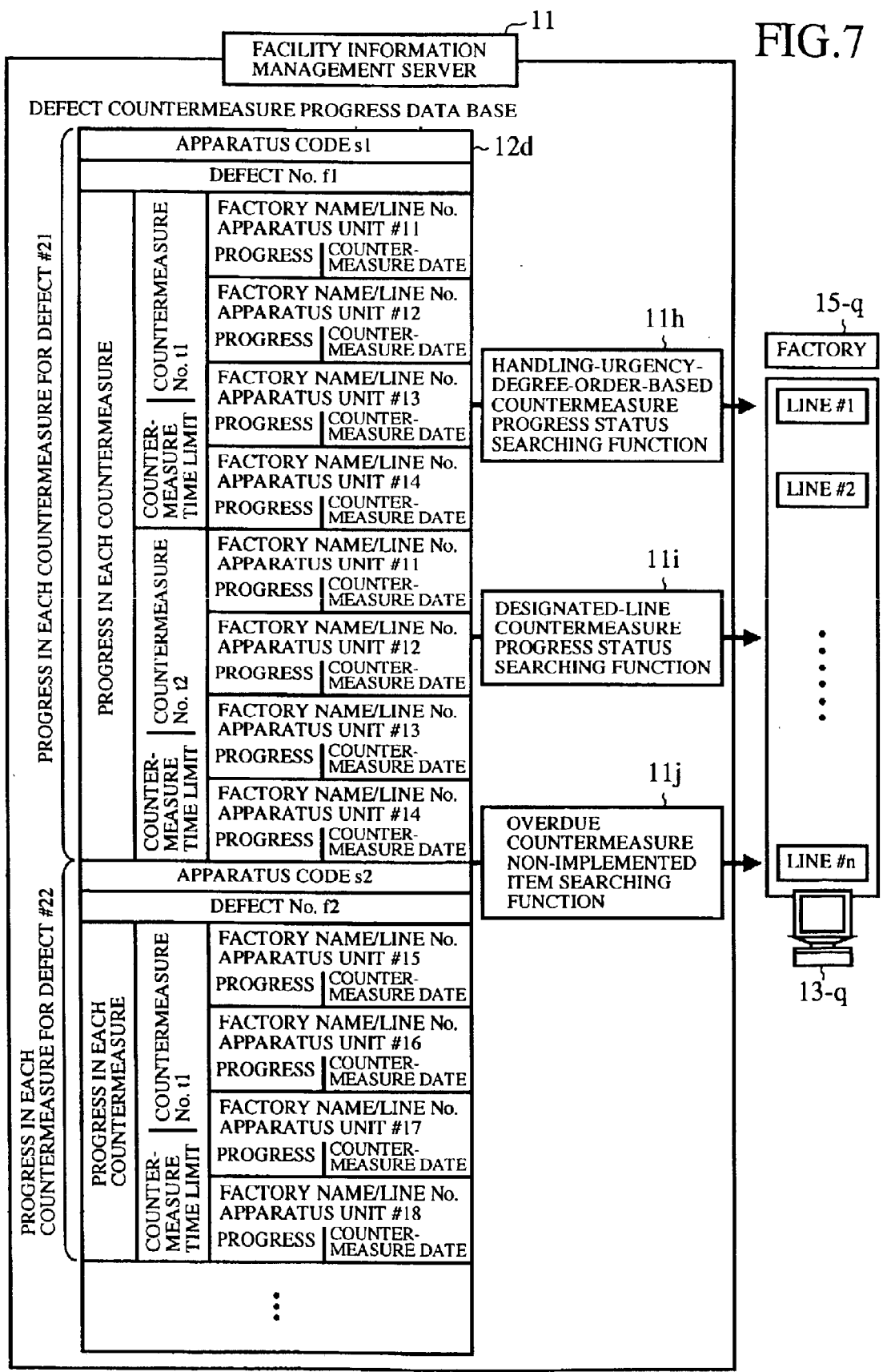
FIG. 7 is a schematic diagram showing a maintenance information management system according to the second embodiment of this invention.

With reference to FIG. 7, it can be seen that various searches can be made relative to the facility information management server 11 from the terminal apparatus 13-$q$. In the illustrated example, the facility information management server 11 has a handling-urgency-degree-order-based countermeasure progress status searching function 11$h$ (i.e., a function to search the status of countermeasure progress based on the order of handling urgency degree), a designated-line countermeasure progress status searching function 11$i$ (i.e., a function to search the status of countermeasure progress in a designated line) and an overdue countermeasure non-implemented item searching function (i.e., a function to search a non-implemented item whose time limit is overdue) 11$j$, in relation to the above-described countermeasure progress information searching function 11$g$.

When a searching is made from the terminal apparatus 13-$q$ for the countermeasure progress status based on the order of handling urgency, the facility information management server 11 searches the defect countermeasure progress database 12$d$ through the handling-urgency-degree-order-based countermeasure progress status searching function 11$h$. The implemented countermeasure numbers and the non-implemented countermeasure numbers are thus obtained relative to all the apparatus units in all the manufacturing lines. Then, the facility information management server 11 arrays the implemented countermeasure numbers and the non-implemented countermeasure numbers in the order of countermeasure numbers (i.e., in the order of handling urgency degree), and displays them in the terminal apparatus 13-$q$ as the countermeasure progress information as arrayed in the order of handling urgency degree. In this connection, the facility information management server 11 may refer to the defect countermeasure database 12$c$ (not illustrated in FIG. 7) in accordance with the countermeasure numbers and the apparatus codes to thereby obtain the contents of the countermeasures for each of the apparatus units so that the contents of the countermeasures are displayed in the terminal apparatus 13-$q$.

When a searching is made, on the other hand, from the terminal apparatus 13-$q$ for the countermeasure progress status by designating the manufacturing line, the facility information management server 11 searches the defect countermeasure progress database 12$d$ through the designated-line countermeasure progress status searching function 11$i$ based on the designated line. The implemented countermeasure numbers and the non-implemented countermeasure numbers related to all the apparatus units in the designated lines are obtained. Then, the facility information management server 11 displays these implemented countermeasure numbers and the non-implemented countermeasure numbers in the terminal apparatus 13-$q$ as the designated-line countermeasure progress information. In this connection, the facility information management server 11 may refer to the defect countermeasure database 12$c$ in accordance with the countermeasure numbers and the apparatus code numbers to thereby obtain the contents of the countermeasures for each of the apparatus units so that the contents of the countermeasures are displayed in the terminal apparatus 13-$q$.

When a searching is made from the terminal apparatus 13-$q$ for the countermeasure progress status by designating the overdue non-implemented countermeasure items, the facility information management server 11 searches the defect countermeasure progress database 12$d$ through the overdue countermeasure non-implemented item searching function 11$j$ to thereby obtain the overdue non-implemented countermeasure numbers. Then, the facility information management server 11 displays in the terminal apparatus 13-$q$ these overdue non-implemented countermeasure numbers as the overdue non-implemented countermeasure item information. In this connection, the facility information management server 11 may display in the terminal apparatus 13-$q$ the non-implemented countermeasure items by arraying them in the order of urgency degree. Further, the facility information management server 11 may refer to the defect countermeasure database 12$c$ in response to the non-implemented countermeasure numbers and the apparatus codes to thereby obtain the contents of the non-implemented countermeasures for each of the apparatus units so that the contents of the non-implemented countermeasures are displayed in the terminal apparatus 13-$q$. In this manner, by making an access from the terminal apparatus to the facility information management server 11, various searches for information can be made.

Third Embodiment

Figure 8:
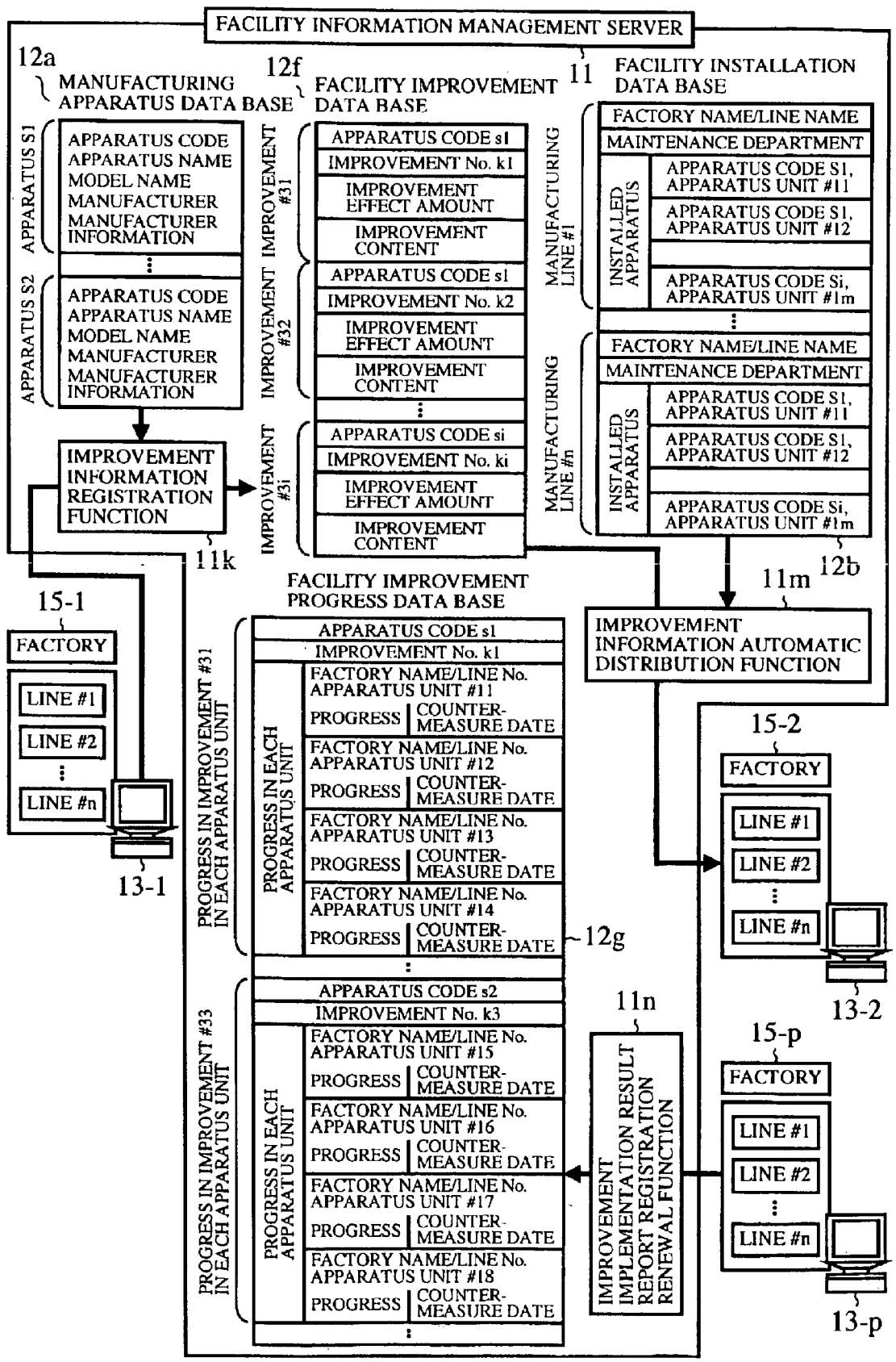
FIG. 8 is a schematic diagram showing a maintenance information management system according to a third embodiment of this invention.

With reference to FIG. 8, the facility information management server 11 has an improvement information registration function 11$k$ (i.e., a function to register. information about improvements), an improvement information automatic distribution function 11$m$ (i.e., a function to automatically distribute information about improvements), and an improvement implementation result report registration renewal function 11$n$ (i.e., a function to renew a report on the result of implementing an improvement). This facility information management server 11 registers the improvement information of the facility (manufacturing apparatus) through the improvement information registration function 11$k$. Further, the facility information management server 11 automatically distributes the registered improvement information through the improvement information automatic distribution function 1$m$ as described in more detail hereinbelow. In addition, the facility information management server 11 performs the registration/renewal of the improvement implementation result report through the improvement implementation result report registration renewal function 11$n$.

Let us assume that improvement information related to the semiconductor manufacturing apparatus has been sent from the terminal apparatus 13-1 to the facility information management server 11. This improvement information has added thereto apparatus information and an improvement effect amount which is estimated to be attained by the improvement. The facility information management server 11 searches the manufacturing apparatus database 12$a$ based on the apparatus information to thereby obtain the apparatus code. Thereafter, the facility information management server 11 records the improvement information into the facility improvement database 12$f$ in accordance with the apparatus code as described in FIG. 4A. As described in FIG. 4B, the facility improvement database 12$f$ has added thereto an improvement number for each of the contents of improvements.

As described above, the facility information management server 11 registers the improvement information into the facility improvement database 12$f$ through the improvement information registration function 11$k$.

After registering the new improvement information into the facility improvement database 12$f$, the facility information management server 11 automatically distributes the improvement information. In other words, once the improvement information has been registered, the facility information management server 11 checks the factory name/manufacturing line name in which the applicable manufacturing apparatus related to the improvement information is being used, by referring to the facility installation database 12b in accordance with the apparatus code related to the improvement information. Then, the facility information management server 11 distributes the improvement information to the applicable terminal apparatus by using the improvement information automatic distribution function 11m based on the factory name/manufacturing line name. In the illustrated example, the improvement information has been distributed to the terminal apparatus 13-2.

In this manner, the facility information management server 11 sends, through the improvement information automatic distribution function 11m, the improvement information to the factory/manufacturing line (maintenance department) in which the applicable manufacturing apparatus is being used.

Once the improvement information has been distributed as described above, the factory/manufacturing line (maintenance department) which has received the distribution of the improvement information performs the improvement countermeasure to the applicable manufacturing apparatus based on the improvement information. Once the improvement countermeasure has been finished, the apparatus unit in which the improvement has been done or implemented, the improvement countermeasure (countermeasure number), and the factory name/manufacturing line number are sent from, e.g., the terminal apparatus 13-p to the facility information management server 11 as a countermeasure implementation report through the mail system. The facility information management server 11 recognizes the date when the improvement countermeasure implementation report was received as the improvement date (countermeasure date), and registers the improvement countermeasure implementation report into the facility improvement progress database 12g and renews the facility improvement progress database 12g (improvement implementation result report registration renewal function 11n, i.e., a function to renew the registration of report on the result of improvement implementation).

As described above, according to the third embodiment, when the improvement information related to the semiconductor manufacturing apparatus is sent, the facility information management server 11 stores it into the database in accordance with the apparatus code and, further, automatically sends the improvement information to all the factories/manufacturing lines using the semiconductor manufacturing apparatus related to the applicable apparatus code. Therefore, there is such an effect that in the factories/manufacturing lines using the same semiconductor manufacturing apparatuses, the improvement corresponding to the improvement information can be performed on the applicable semiconductor manufacturing apparatuses. As a result, the improvement information can be effectively utilized by all the factories/manufacturing lines.

Fourth Embodiment

With reference to FIG. 9, let us assume that a manufacturing apparatus that was installed in the manufacturing line, e.g., of factory 15-1 has been relocated to the manufacturing line of factory 15-p. It is sufficient to assume an example in which a manufacturing apparatus is relocated from one manufacturing line of factory 15-1 to another manufacturing line. The following description will therefore be made on the assumption that a manufacturing apparatus has simply been relocated from one manufacturing line to another manufacturing line. The terminal apparatus 13-1 related to the manufacturing line before relocation sends the installation place change information (i.e., information about a change in place of installation of the manufacturing apparatus) to the facility information management server 11. This installation place change information contains therein, as the pre-relocation information, the factory name/manufacturing line name in which the manufacturing apparatus was installed before relocation, and the apparatus code, and also contains therein the factory name/manufacturing line name after the relocation as the post-relocation information.

Once the installation place change information has been received, the facility information management server 11 searches the facility installation database 12b based on the pre-relocation information to thereby obtain the applicable factory name/manufacturing line name and apparatus code. Based on the post-relocation information, the facility information management server 11 records the apparatus code in association with (or by correlating it to) the post-relocation factory name/manufacturing line name, and renews the facility installation database 12b (installation place change function 11b, i.e., a function to change the place of installing the facility).

After renewing the facility installation database 12b as described above, the facility information management server 11 checks as to whether there exists non-implemented defect countermeasure and improvement countermeasure related to the relocated manufacturing apparatus. In other words, the facility information management server 11 searches, based on the pre-relocation information, the defect countermeasure database 12c, the defect countermeasure progress database 12d, the facility improvement database 12f, and the facility improvement progress database 12g. In FIG. 9, the defect countermeasure progress database 12d, and the facility improvement database 12f are not illustrated. Checking is thus made as to whether there exists a non-implemented defect countermeasure and a non-implemented improvement countermeasure related to the applicable manufacturing apparatus to be relocated. If there exists a non-implemented defect countermeasure, a non-implemented defect countermeasure (inclusive of the contents) is transmitted to the applicable terminal apparatus (e.g., terminal apparatus 13-p) based on the post-relocation information. If there exists a non-implemented improvement countermeasure, the non-implemented improvement countermeasure (inclusive of the contents) is transmitted to the applicable terminal apparatus 13-p based on the post-relocation information (non-implemented defect/improvement countermeasure automatic distribution function 11g, i.e., a function to automatically transmit non-implemented defect/improvement countermeasures).

As described above, according to the fourth embodiment, once the installation position change information related to the semiconductor manufacturing apparatus has been sent, the facility information management server 11 renews the facility installation database. If there is a non-implemented defect countermeasure and/or a non-implemented improvement countermeasure relative to the post-relocation manufacturing line, the installation information management server 11 transmits to that effect. Therefore, even if the semiconductor manufacturing apparatus is relocated, the non-implemented defect countermeasure and/or the non-implemented improvement countermeasure will not be forgotten or left unattended to.

As described above, according to this invention, the maintenance information management server is adapted to be connected to the following databases, i.e., a manufacturing apparatus database having stored therein an apparatus code for identifying a semiconductor manufacturing apparatus for each kind of semiconductor manufacturing apparatuses and having stored therein apparatus information related to an apparatus name and an apparatus model name of a semiconductor manufacturing apparatus for each of the apparatus codes; a facility installation database having registered therein facility information about a semiconductor manufacturing apparatus installed in each factory/manufacturing line in association with the apparatus code; a defect countermeasure database having stored therein defect information showing a content of a defect occurred to the semiconductor manufacturing apparatus in association at least with the apparatus codes and having stored therein defect countermeasure information showing a content of a countermeasure to handle the defect. When the defect information as well as the countermeasure information in association with the defect information related to a semiconductor manufacturing apparatus installed in one of factories/manufacturing lines are given as defect countermeasure information, the maintenance information management server (facility information management server) registers the defect countermeasure information into the defect countermeasure database based on the apparatus code of the applicable semiconductor manufacturing apparatus having the defect. In addition, the defect information management server searches the facility installation database based on the apparatus code of the semiconductor manufacturing apparatus having the defect, and distributes the defect countermeasure information as maintenance information to all other factories/manufacturing lines having installed therein semiconductor manufacturing apparatuses each with the apparatus code identical with the apparatus code of the applicable semiconductor manufacturing apparatus having the defect. Therefore, there is such an effect that the maintenance information (defect information and countermeasure information) can be adequately managed and utilized in all the factories/manufacturing lines.

According to this invention, the maintenance information management server registers additional countermeasure information into the defect countermeasure database and distributes this additional countermeasure information to all other factories/manufacturing lines. Therefore, there is an effect in that all the maintenance information can be effectively utilized in all the factories/manufacturing lines.

According to this invention, since the handling urgency degree is sent to the other factories/manufacturing lines, it is possible on the part of the factories/manufacturing lines to implement countermeasures in response to the handling urgency degree.

According to this invention, the facility information management server registers the defect countermeasure progress status and the countermeasure date. Therefore, there is an effect in that the progress of the countermeasure against defects is adequately managed and that it is possible to urge the factories/manufacturing lines to take countermeasures in response to the defect countermeasure progress status.

According to this invention, it is possible to search the various pieces of maintenance management information through access from the factories/manufacturing lines to facility information management server. Therefore, it is possible on the part of the factories/manufacturing lines to adequately confirm the progress status or the like of the defect countermeasures.

According to this invention, the improvement information which does not relate to a defect is a so managed and distributed in the same manner as the defect countermeasure information. Therefore, there is an effect in that the improvement implemented in another factory/manufacturing line can also be adequately implemented in the applicable factory/manufacturing line.

According to this invention, if there is a non-implemented defect countermeasure and/or a non-implemented improvement countermeasure, this fact is transmitted to the post-relocation manufacturing line. Therefore, even if the semiconductor manufacturing apparatus is relocated, there is no possibility of forgetting to attend to the defect countermeasure and/or improvement countermeasure. It is readily apparent that the above-described maintenance information management server, the maintenance information management system, and the method of managing the maintenance information meet all of the objects mentioned above and also have the advantage of wide commercial utility. It should be understood that the specific form of the invention described above is intended to be representative only, as certain modifications within the scope of these teachings will be apparent to those skilled in the art.

Accordingly, reference should be made to the following claims in determining the full scope of the invention.

What is claimed is:

1. A maintenance information management server adapted to be connected to:

a manufacturing apparatus database having stored therein an apparatus code for identifying a semiconductor manufacturing apparatus for each kind of semiconductor manufacturing apparatuses, and having stored therein apparatus information related to an apparatus name and an apparatus model name of a semiconductor manufacturing apparatus for each of the apparatus codes;

a facility installation database having registered therein facility information about a semiconductor manufacturing apparatus installed in each factory/manufacturing line in association with the apparatus code; and to a defect countermeasure database having stored therein defect information showing the content of a defect occurred to an applicable semiconductor manufacturing apparatus in association at least with the apparatus code, and also having stored therein defect countermeasure information showing the content of a countermeasure in association with the defect information, said maintenance information management server comprising:

a defect countermeasure information registration function which, when defect information related to an applicable semiconductor manufacturing apparatus installed in an applicable factory/manufacturing line and countermeasure information to cope with the defect, as defect countermeasure information, are given from one of the factories/manufacturing lines, searches the facility installation database to thereby obtain an apparatus code of the applicable semiconductor manufacturing apparatus having the defect and also to register the defect countermeasure information into the defect countermeasure database based on the apparatus code; and a defect countermeasure information distribution function which searches the facility installation database based on the apparatus code of the semiconductor manufacturing apparatus having the defect and distributes the defect countermeasure information as maintenance information to all other factories/manufacturing lines having installed therein semiconductor manufacturing apparatuses each with an apparatus code identical with that of the applicable semiconductor manufacturing apparatus having the defect.

2. The maintenance information management server according to claim 1, further comprising:
an additional countermeasure registration function which, when additional countermeasure information related to the semiconductor manufacturing apparatus having the defect is given from one of the factories/manufacturing lines registers the additional countermeasure information into the defect countermeasure database in addition to the defect countermeasure information that has already been registered; and
an additional countermeasure information distribution function which searches the facility installation database based on the apparatus code of the semiconductor manufacturing apparatus having the defect to thereby distribute the additional defect countermeasure information as additional maintenance information to all other factories/manufacturing lines having installed therein semiconductor manufacturing apparatuses each having an apparatus code identical with the apparatus code of the semiconductor manufacturing apparatus having the defect.

3. The maintenance information management server according to claim 1 adapted to be connected to a handling urgency degree table having registered therein a degree of urgency for handling the defect in response to a damage amount,
wherein said defect countermeasure information contains an estimated damage amount due to the defect,
wherein said defect countermeasure information registration function searches from said handling urgency degree table a handling urgency degree in response to the estimated damage amount to thereby register the handling urgency degree for each of the apparatus codes into the defect countermeasure database, and
wherein said defect countermeasure information distribution function also sends said handling urgency degree when said defect countermeasure information is sent to all other factories/manufacturing lines.

4. The maintenance information management server according to claim 1 adapted to be connected to a defect countermeasure progress database having registered therein a defect countermeasure progress status in association with the apparatus code and the defect information, said maintenance management server further comprising:
a countermeasure implementation information registration renewal function which, when a countermeasure implementation report showing a status of implementation of a defect countermeasure in other factories/manufacturing lines in accordance with the defect countermeasure information is received, registers into the defect countermeasure progress database the countermeasure implementation report as the defect countermeasure progress status and also registers a countermeasure date in accordance with the countermeasure implementation report; and
a non-implemented countermeasure information distribution function which, if the countermeasure implementation report is not received by a time limit designated by the defect countermeasure information, distributes information showing an overdue non-implemented countermeasure to factories/manufacturing lines which fail to transmit the countermeasure implementation report.

5. The maintenance information management server according to claim 4, further comprising a countermeasure progress status searching function which, when inquired about an implemented countermeasure and/or a non-implemented countermeasure by designating an apparatus code from a factory/manufacturing line, searches the defect countermeasure progress database in accordance with the apparatus code to thereby transmit to the factory/manufacturing line the implemented defect countermeasure information and/or non-implemented countermeasure information.

6. The maintenance information management server according to claim 5, wherein said defect countermeasure progress database has registered therein a defect countermeasure progress status for each of the factories/manufacturing lines to cope with the apparatus code and defect information, and wherein said countermeasure progress status searching function searches the defect countermeasure progress database based on an order of handling urgency degree, a designated manufacturing line and/or overdue time limit to thereby transmit to the factory/manufacturing line a defect countermeasure progress status showing the search result.

7. The maintenance information management server according to any one of claim 1, further comprising:
an improvement information registration function which, when improvement information to show an improvement result related to the semiconductor manufacturing apparatus installed in the applicable factory/manufacturing line is given from one of the factories/manufacturing lines, registers the improvement information into the facility improvement database in association with the apparatus code based on the apparatus code of the improved semiconductor manufacturing apparatus; and
an improvement information distribution function which searches the facility installation database based on the apparatus code of the improved semiconductor manufacturing apparatus to thereby distribute the improvement information as maintenance information to all other factories/manufacturing lines having installed therein a semiconductor manufacturing apparatus each with an apparatus code identical with the apparatus code of the applicable improved semiconductor manufacturing apparatus.

8. The maintenance information management server according to claim 7 adapted to be connected to facility improvement progress database for registering therein an improvement countermeasure progress status in association with the apparatus code and the improvement information, further comprising an improvement implementation information registration renewal function which, when an improvement implementation report is received showing an improvement countermeasure implementation status implemented in other factories/manufacturing lines in accordance with the improvement information, registers the improvement implementation report into the facility improvement progress database and also registers the countermeasure date in accordance with the improvement implementation report.

9. The maintenance information management server according to claim 7, further comprising:
an installation place change function which, when a relocation information is given from one of the factories/manufacturing lines to show that a semiconductor manufacturing apparatus installed in the applicable factory/manufacturing line has been relocated to another factory/manufacturing line, changes the facility information in association with the apparatus code related to the applicable relocated semiconductor manufacturing apparatus in the facility installation database from the pre-relocation factory/manufacturing line to a post-relocation factory/manufacturing line; and a non-implemented countermeasure distribution function which searches at least the defect countermeasure database and the facility improvement progress database based on the apparatus code of the relocated semiconductor manufacturing apparatus, checks whether there exists a non-implemented defect countermeasure and/or a non-implemented improvement countermeasure and, if there exists a non-implemented defect countermeasure and/or a non-implemented improvement countermeasure, searches the facility installation database to thereby distribute information showing that there exists the non-implemented defect countermeasure and/or the non-implemented improvement countermeasure in the factory/manufacturing line to which the relocated semiconductor manufacturing apparatus has been relocated.

* * * * *